United States Patent Office 3,504,176
Patented Mar. 31, 1970

3,504,176
METHOD AND APPARATUS FOR FOCUSING
THE OBJECTIVE LENS OF A PARTICLE
BEAM MICROSCOPE
Friedrich Thon, Berlin, Germany, assignor to Siemens
Aktiengesellschaft, a corporation of Germany
Filed July 12, 1967, Ser. No. 652,840
Claims priority, application Germany, July 13, 1966,
S 104,764
Int. Cl. H01j *37/26*
U.S. Cl. 250—49.5                                  14 Claims

ABSTRACT OF THE DISCLOSURE

In an electron or ion microscope the objective lens is electrically focused by producing with the aid of that lens an image of an object on the signal plate of a video tube and scanning the image with the electron beam of the tube to obtain a signal voltage whose frequencies (time frequencies) correspond to the space frequencies of the object, i.e. to the spatial distribution of the internal potential in the object. The signal voltage is analyzed to detect the occurrence of given frequencies, and the field excitation of the objective lens is varied until such occurrence is brought about. The scanning and frequency selective process is also used for adjusting a stigmator for correction of astigmatism.

---

The invention realtes to corpuscular beam or particle beam apparatus, such as an electron or ion microscope, and in a more particular aspect to a method and system for obtaining in such apparatus a precise focusing of the objective lens onto a plane situated within an object or at a predetermined distance from the object.

The phase contrast effect can be used in corpuscular beam optical research on thin films or the like objects at high resolution and small radiation aperture. The details of the object cause a potential distribution in the object which mainly influences the phase of the entering waves. It has proved convenient to represent the spatial distribution of the inner potential by a Fourier series, and look upon the object as being composed of sinusoidal phase lattices of greatly different phase frequencies. The theory, confirmed by experiment, asserts that each Fourier component of the spatial potential distribution present in the object can be allotted to a plane, at the interval $\Delta z$ immediately before or behind the object, in which a current density distribution of maximum contrast is formed at the wave lengths $\Lambda$ of this component.

The imaging effected by the objective lens causes additional phase shifts which result in several separate bands of space frequencies contributing to the image structure at each selected focusing value. All of these space frequencies cannot be simultaneously covered by the imaging. It is desirable, therefore, to adjust precisely the focusing to the setting which either forms an image from the widest possible frequency band, or from the combination of frequency bands suitable for the particular research required. To this end, the objective lens of the corpuscular beam microscope must be focused with a precision of a few nm. onto a plane situated a determinate small distance above or below the object plane. This distance is approximately in the region between zero and a few thousand nm. Adjustment simply by visual observation of the image structures is not exact enough for the aim pursued here. Nor is it possible to calibrate the controller for the excitation of an electromagnetic objective lens in absolute values of the distance $\Delta z$ that are to be valid for all research purposes, since the position of the object, from case to case, may be subjected to deviations in the axial direction which, though small, are appreciable in view of the minute value of $\Delta z$.

It is an object of my invention to overcome these difficulties and to afford in corpuscular beam apparatus a reliable and more precise focusing of the objective lens than heretofore attainable, thus achieving a correspondingly improved quality of the image produced.

To this end, and in accordance with the invention, I produce with the aid of the objective lens an image of an object on an image plane, preferably the image plane of a signal plate in a video camera tube, and scan the image by an electron beam thus producing an electric signal, whereby the space frequencies of the image—which, as mentioned above, correspond to respective Fourier components of the spatial distribution of the internal potential within the object—are translated into time frequencies. I further analyze the signal voltage as regards the time frequencies contained therein, and vary the excitation of the objective lens so as to obtain in the image the particular space frequencies indicative of the desired focusing.

According to further features of the invention, the just-mentioned focusing method is performed automatically by means of an electrically controllable, preferably electromagnetic objective lens whose effective focal length is varied by varying the excitation voltage or current applied for producing the lens field. Varying the excitation thus affords focusing the objective lens onto a plane situated in an object (specimen) or at a predetermined axial distance therefrom. With such a lens, known as such, I combine a signal plate to receive a magnified image of the object, this plate forming part of an electron-beam scanning device to furnish the above-mentioned signal voltage; and I connect the device to analyzer means which analyze the signal voltage and are in turn connected to the excitation control means of the objective lens to vary the lens field excitation as required to have the image contain the space frequencies correlated to the precise focusing desired.

The invention is predicated upon the fact that for any value of the distance $\Delta z$, which may also be equal to zero, there exists a univalent correlation of $\Delta z$ to those space frequencies or their corresponding wave lengths $\Lambda$ that are imaged with maximal contrasts. Hence the distance $\Delta z$, also called the defocus, is to be chosen with reference to those object details (space frequencies) that are to be reproduced in the image at maximum contrasts.

While the above-mentioned analysis of the space frequencies is fundamental to the invention, the described conversion of the space frequencies into time frequencies for the purpose of such analysis constitutes a further feature of the best embodiment known to me and preferable because readily applicable with the aid of conventional electronic means. The conversion, however, can be dispensed with if means for a more direct analysis of the space frequencies in corpuscular beam apparatus are made available.

The invention will now be further described with reference to the accompanying drawings, in which:

FIG. 1 shows the relationship, theoretically determined and confirmed by experiment, between the reciprocal space frequencies (wave lengths) $\Lambda$ reproduced with maximal contrast and the distance $\Delta z$ of the focusing plane from the object plane of a given objective lens.

These curves are in accordance with the following equation:

$$\Lambda = \lambda \left[ \frac{\Delta z}{C_0} \pm \left( \frac{\Delta z^2}{C_0^2} + \frac{(2n-1)\lambda}{C_0} \right)^{1/2} \right]^{-1/2}$$

in which $\lambda$ denotes the wave length of the corpuscular radiation, i.e. a magnitude determined by the beam voltage of the microscope; $C_0$ is the apertural error of the lens; and $n$ is a positive or negative integer, including the zero value.

Figure 1:
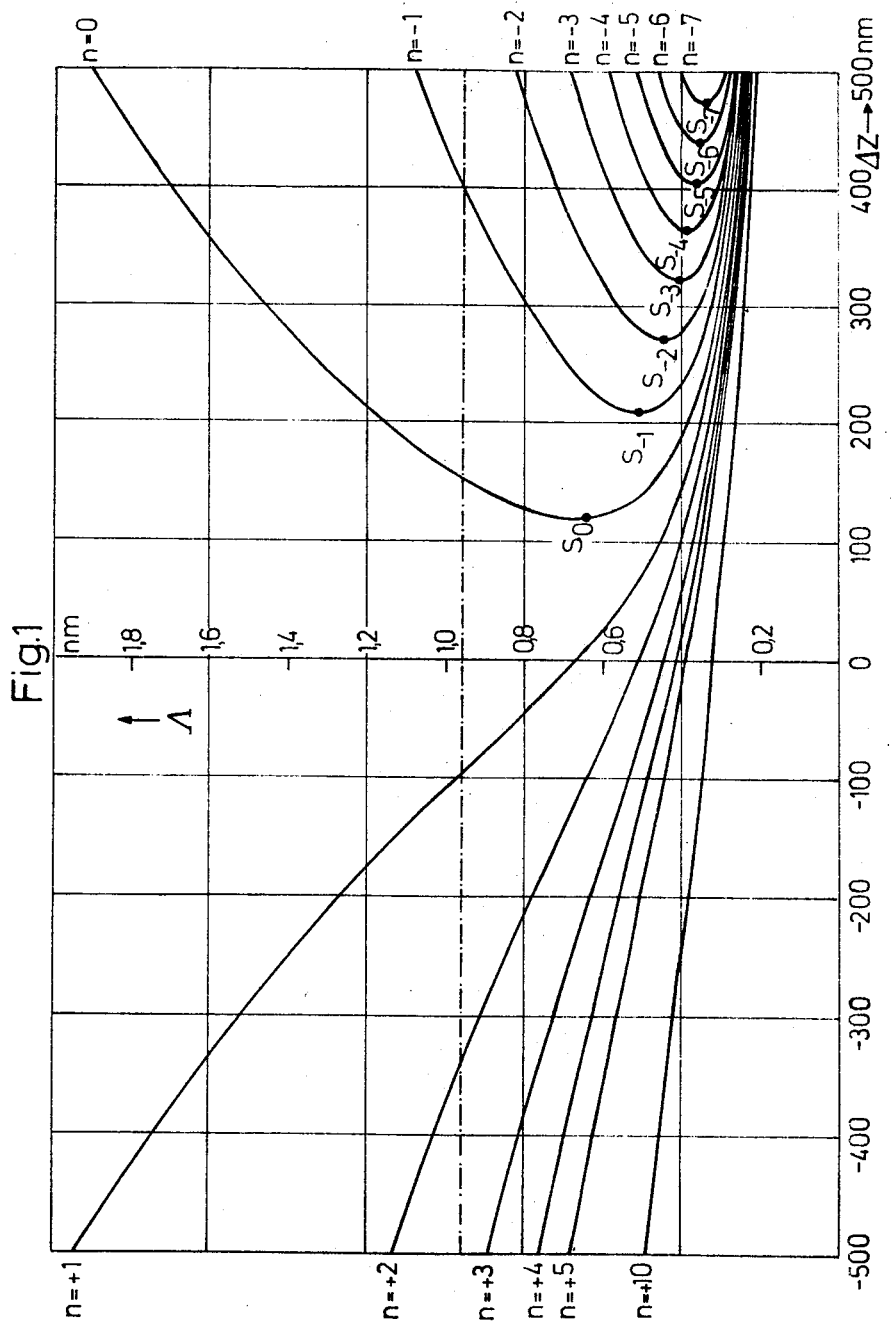
FIG. 1 is a graph of the relationship between space frequencies and defocusing distance.

It will be seen from FIG. 1 that each value of $\Delta z$ (abscissa) is specifically allocated a certain frequency spectrum, so that conversely a certain defocus $\Delta z$ can be deduced from the occurrence of a certain space frequency spectrum.

The desired focusing plane will often be situated in the region around the peak $S_0$, so that the particular distance value $\Delta z$ can only be determined imprecisely due to the oblique intersection with the appropriate ordinate line of the curve for $n=0$ and with the here likewise hardly suitable branches of the curves for positive values of $n$. Preferably, in such cases, the following variant of the method according to the invention is employed. First the numerical relation between the defocus $\Delta z$ on the one hand and the wave lengths $\Lambda$ of the space frequencies imaged with the different focusings on the other hand is determined theoretically for the particular objective lens, using the above-mentioned equation. From the data thus obtained, a diagram corresponding to FIG. 1 is drawn, at least partially so as to show the critical region thereof. Then a predetermined focus in a critical region is selected for which the corresponding distance $\Delta z$ can be deduced with great exactitude. Using this distance value as a reference, the excitation of the objective lens is changed by the amount necessary to obtain the desired focusing.

Thus, this mode of proceeding according to the invention avoids the necessity to measure the quantities which determine the peak $S_0$ (which cannot be done accurately), or of similarly situated values in the curve. Instead, a definite value of the defocus $\Delta z$ is set, for instance at 400 nm, this value being characterized by its space frequencies $\Lambda$. Thereafter the lens excitation current is changed so as to obtain the desired focusing, for example at $S_0$. Here, the magnitude of the lens excitation current obtaining at the reference value of the defocus serves as starting value, and the change in lens excitation required to obtain the desired focusing can be easily determined for the lens as a function of the distance $\Delta z$. For certain regions, the excitation-current adjusting device can be calibrated in nm.

The signal frequencies (time frequencies) obtained from the space frequencies by scanning the signal plate in the preferred embodiment can be passed to a frequency selective circuit, for instance a filter, serving as analyzer having transmissive regions for those space frequencies which are transmitted with contrast at the predetermined or desired focusing. A frequency indicator can be connected to the filter output to facilitate monitoring or recognizing the attainment of the desired focusing or of the reference value.

Automatic focusing may be effected, for instance, by a servomotor actuating a current controller for varying the excitation of the objective lens. The motor preferably is stopped by the control signal passed through a frequency-selective amplifier as soon as the motor has set the excitation current of the objective lens to the magnitude required for the desired or predetermined focusing. As soon as the space frequencies alloted to the desired focusing or to the predetermined reference distance occur in the image, the amplifier issues the command to stop the servomotor, for instance through a rapidly operating relay interrupting the motor circuit.

Where the focusing has been effected to the predetermined reference value of $\Delta z$, a previously stored command can be given in any suitable manner by operation of a push-button switch in the control circuit of the lens current controller. The command, ofr instance, may consist in a current pulse whose amplitude or duration corresponds to the change in lens excitation required for obtaining the desired focusing.

If the objective lens is electrostatic, its excitation voltage is to be varied substantially in the same manner as the excitation current of the electromagnetic lens mentioned above.

Preferably used as an object for the focusing adjustment is not a specimen material but rather the carrier foil usually employed for carrying the specimens, since in such carrier foils all space frequencies are contained with certainty.

If the objective lens or any apertured diaphragms present in the microscope cause astigmatism of a finite magnitude, this is manifested by the fact that the focusing of the lens for a given excitation is different in two directions transverse to each other. This is of importance, as differences in the order of magnitude of nm. can play an important role. Therefore, a stigmator may be provided and should be adjusted to optimal astigmatism correction before adjusting the desired focusing. Such stigmators and their adjusting means are well known in this art, so that no further description of them need be given.

After thus correcting for astigmatism prior to adjustment of the focusing, and assuming an ideal correction, there will obtain the same focusing of the lens in all directions within a plane perpendicular to the axis of the corpuscular beam microscope. However, the stigmator for the objective lens may also be adjusted to optimal astigmatism correction after adjustment of the desired focusing of the lens, but care must then be taken to preserve the adjusted (desired) focusing in one direction, and equalize by the adjustment of the stigmator the focusing in the transverse direction to the focusing in the first-mentioned direction.

A conventional television camera tube may be used for scanning the image structures to convert the space frequencies into time frequencies. The video singal voltage containing the output signal (time) frequencies is supplied to the analyzer. Scanning is effected in the usual manner, line by line, the deflection system of the video device being driven by a scan generator.

The same video device may be used to effect adjustment of the stigmator to the optimal astigmatism correction, if there is relative rotation of the scan and the image. The image structures are scanned line by line in the device but the line system of the device rotates at such a velocity that it carries out one rotation in the time required for several complete image scannings. The adjustment of the stigmator is changed until a filtered-out high-frequency share of the video signal has an amplitude which is at least approximately constant in time. This performance is predicated upon the fact that in the event of finite astigmatism in the image, different defocusings are present in directions perpendicular to each other. Hence respectively different space frequencies occur in these directions. If the image is scanned line by line during rotation of the line system, and a frequency share of the video signal is filtered out, this share exhibits amplitude fluctuations at a finite astigmatism, which disappear when the astigmatism disappears. Both adjusting processes can be carried out simultaneously.

To permit the use of the same television device for adjustment of the stigmator as well as for exact focusing of the objective lens, the deflecting system of the television device may be controlled via a mixing stage, whose one input is connected to a scanning generator and whose other input can be connected with a rotary field generator for the adjustment of the stigmator.

If the adjustment of the stigmator is to be automatic too, then the frequency analyzer can also be connected to a servomotor for adjusting the stigmator.

Figure 2:
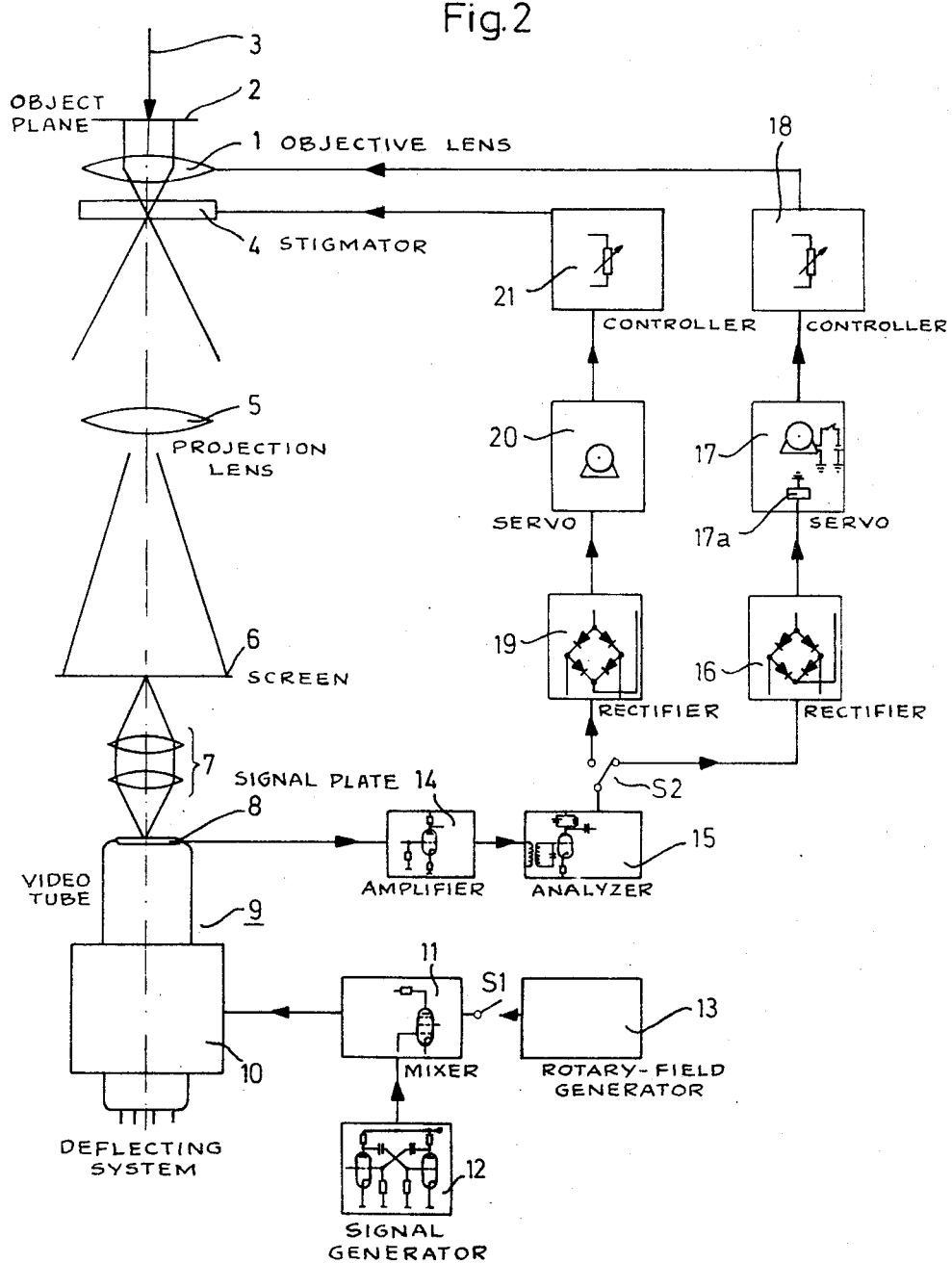
FIG. 2 is a simplified schematic diagram of an exemplary embodiment of the invention.

Such an arrangement is diagrammatically shown in FIG. 2. The individual modules, shown in block fashion, contain known and commercially available circuits or components and hence are only depicted schematically to indicate their basic construction and interrelation within the complete system.

In this embodiment, the lens to be adjusted is an electromagnetic objective lens 1 of an electron microscope which is arranged in the usual manner below the plane 2 of an object bombarded by an electron beam 3. A stigmator 4 is situated below the objective lens 1. In this exemplary embodiment the stigmator is electromagnetic, having coils through which current passes. The reproduction part of the microscope contains a projection lens 5 and a transparent luminous screen 6. The image projected onto the screen 6 is passed via a tandem optical system 7 to a signal plate 8 of a video tube 9 in which the image is scanned line by line. The deflecting system 10 of the video device 9 receives line deflecting pulses through a mixing stage 11 from a deflecting signal (saw-tooth) generator 12, and also receives a rotary-field signal from a rotary-field generator 13 under control by a switch S1.

While the lenses 1 and 5 are schematically shown in light-optical fashion, they are of course electron or ion beam lenses such as well known, for example from the electron microscopes and literature vailable from Siemens A.G., Germany (or Siemens America Inc., New York, N.Y.). As regards details of suitable stigmators, reference may be had to the Siemens electron microscope or, for example, to the copending application Ser. No. 442,389, filed Mar. 24, 1965, now Patent 3,444,427, assigned to the assignee of the present invention.

For adjusting the focusing of the objective lens 1, the switch S1 may be open, so that the rotary field generator 13 is disconnected from the mixing stage 11. In accordance with the current density distribution in the final image plane 6, determined by the scanning then effected purely line by line, the video signal contains time frequency components which correspond to the space frequencies contained in the final image. This signal is fed through a pre-amplifier 14, to an analyzer 15, which in this exemplary embodiment is a narrow band amplifier. Other kinds of filter arrangement may be used, such as a tone frequency generator, where the transmissive regions are selected in such a way that only the space frequencies allotted to the desired focusing, i.e. to the desired distance $\Delta z$, are allowed to pass through when they occur.

For adjusting the focusing, the switch S2 is set to the illustrated position, so that the frequencies passing through the analyzer 15 are rectified in a rectifier 16. The rectified output forms a control signal and is applied to a servo-motor 17 which varies the setting of a rheostat or potentiometer of a lens-current controller 18. When the desired distance $\Delta z$ is reached, the arrival of the corresponding, pre-selected space frequencies at a relay 17a causes this relay to open a contact in the circuit of the servomotor 17 and so stops the motor. The adjustment of the lens-current adjuster 18 is then maintained.

For stigmator adjustment, the switches S1 and S2 are to be shifted to the non-illustrated positions respectively. This operation of switch S1 produces the described rotation of the line deflection system of video device 9, so that the pre-amplifier 14 supplies the analyzer 15 with a frequency component of the video signal having changing amplitude. This amplitude fluctuation is rectified in a rectifier 19 and actuates a servo-control 20 for a stigmator adjusting device 21 in such a way that the adjustment of the stigmator 4 is changed until, due to compensation of the astigmatism by the stigmator, the amplified frequency component of the video signal has an at least approximately constant amplitude.

If the focusing and the stigmator adjustment are always to be carried out simultaneously, the switches S1 and S2 can be omitted, and a common rectifying arrangement can replace the separate rectifiers 15 and 19.

During precision focusing adjustment a visual observation with its known disadvantages is unnecessary. A rough adjustment while observing the contrast of the screen image will suffice, the subsequent precision adjustment being then performed with lens-currents in the order of magnitude of $\mu a$. in the described nonsubjective manner.

As a rule, the simultaneous occurrence of several definite frequency bands is taken as a criterion for reaching a given focusing, i.e. a certain distance $\Delta z$. However, the width of a frequency band or a small number of frequency bands can also be used for this purpose, since these, too, are dependent upon the focusing in each case.

The extremely accurate focusing afforded by the invention is of particular advantage if correction members for lens systems according to Hoppe are to be employed. Such correction members consist of a diaphragm with alternately electron-permeable and electron-impermeable regions of such dimensioning that only waves that satisfy given phase conditions can contribute to the formation of the image. Accordingly, if only one of these correction diaphragms is being used, a number of image details are not represented in the electron-optical image since the correlated space frequencies are suppressed by the diaphragm. It has been suggested, therefore, to use several such correction diaphragms, one after the other, for obtaining an image of the object or specimen structure, the respective correction diaphragms being differently dimensioned and the lens excitations for use with the respective diaphragms being differently chosen in such a manner that each of the individual correction diaphragms causes just those space frequencies to be imaged that are suppressed by the other correction diaphragms.

It will be recognized that when employing such a modern technique for improving image quality, the space frequencies to be imaged must appear in the image with greatest feasible contrast and consequently that the corresponding defocus distances must be adjusted with maximum precision; and such a high degree of accuracy is reliably attainable by the focusing process and equipment according to the present invention.

I claim:

1. The method of focusing the objective lens of a particle beam microscope in which an object having a spatially distributed potential is placed in the beam path, the method comprising irradiating the object with the beam for altering the beam so as to contain space frequencies corresponding to the spatially distributed potential in the object; passing the beam through an objective lens for producing an image of the object containing a system of space frequencies corresponding to the excitation of the objective lens, and ascertaining from the image the system of space frequencies contained in the image; comparing the frequencies contained in the image with a given system of frequencies indicative of the desired focusing of the objective lens; and varying the electric excitation of the objective lens until the frequencies contained in the image are in accordance with the given system of frequencies.

2. The method according to claim 1 for focusing the objective lens in a particle beam microscope having a stigmator for correction of astigmatism, which comprises adjusting the stigmator to optimal correction prior to performing the imaging and focus adjusting steps set forth in claim 1.

3. The method according to claim 1 for focusing the objective lens in a particle microscope having a stigmator for correction of astigmatism, which comprises first focusing the objective lens as set forth in claim 1 and thereafter setting the stigmator so as to preserve the focusing in a first direction within a given plane and approaching said focusing in a second direction perpendicular to said first direction in said plane.

4. The focusing method according to claim 1, wherein said object is a specimen carrier foil.

5. The method according to claim 1, which comprises sequentially imaging the object through respective correction diaphragms, one at a time, for suppressing respectively different space frequencies of the object so that the complete image structure results from imaging with several of said diaphragms; and focusing the objective lens each time for the individual ones of said diaphragms by the steps set forth in claim 1.

6. The method of focusing the objective lens of a particle beam microscope in which an object having a spatially distributed potential is placed in the beam path, the method comprising irradiating the object with the beam for altering the beam so as to contain space frequencies corresponding to the spatially distributed potential in the object; passing the beam through an objective lens for producing on a signal plate an image of the object containing a system of space frequencies corresponding to the excitation of the objective lens; scanning said signal plate with an electron beam and thereby obtaining a signal, in which the system of space frequencies contained in the image is represented by time frequencies; subjecting the signal to Fourier analysis to obtain a system of output frequencies indicative of the space frequencies within the image; and varying the electric excitation of the objective lens until the system of output frequencies is in accordance with a given system of space frequencies indicative of the desired focusing.

7. The focusing method according to claim 6, which comprises first theoretically determining for the particular objective lens the numerical relation between the defocus distance ($\Delta z$) of the focusing plane from the object plane of the objective lens on the one hand and the wave lengths ($\Lambda$) that correspond to the space frequencies imaged at respectively different defocus distances on the other hand; then initially adjusting the objective lens to a focusing for which the correlated defocus value $\Delta z$ is precisely known from said previously determined numerical relation; and then varying the lens excitation by the amount necessary for the desired focusing while using said defocus value as a reference.

8. The focusing method according to claim 7, which comprises determining said numerical relation between the defocus distance ($\Delta z$) and the wave lengths ($\Lambda$) of the space frequencies with reference to the effect of the aperture fault $C_0$ of the objective lens and the wave length ($\lambda$) of the particle beams, so as to satisfy the equation $$\Lambda = \lambda \left[ \frac{\Delta z}{C_o} \pm \left( \frac{\Delta z^2}{C_o^2} + \frac{(2n-1)\lambda}{C_o} \right)^{1/2} \right]^{-1/2}$$

wherein $n = 0, \pm 1, \pm 2, \ldots$

9. The focusing method according to claim 6, which comprises effecting said scanning of said signal plate by line scanning in a video tube to obtain a video signal voltage, and frequency-analyzing said video voltage to obtain said system of output frequencies.

10. The method according to claim 9 for focusing the objective lens in a particle beam microscope having a stigmator for correction of astigmatism, which comprises rotating the line scan pattern one full rotation for several consecutive complete line scanning operations, filtering a share of frequencies out of said video output frequencies, and varying the adjustment of the stigmator until said share of video frequencies exhibits a substantially constant amplitude.

11. With a particle beam microscope having an electrically focusable objective lens and holding an object having a spatially distributed potential, the object being positioned in the beam path whereby the object is irradiated by the beam thereby altering the latter to contain space frequencies corresponding to the spatially distributed potential, the combination of apparatus for focusing the objective lens to form an image containing a given system of space frequencies, said apparatus comprising an electronic scanning device having a signal plate which forms an image plane for receiving an image of the object produced by said objective lens, said image containing a system of space frequencies corresponding to the excitation of said objective lens, said device having line scanning means for periodically scanning the image to furnish a signal voltage whose time frequencies correspond to said system of space frequencies contained in said image, frequency analyzer means connected to said device and responsive to the occurrence in said signal voltage of time frequencies corresponding to said given system of space frequencies; and lens excitation control means responsive to the output of said analyzer means and connected to said obective lens for varying the focusing adjustment of said objective lens until said signal voltage is furnished containing said time frequencies corresponding to said given system of space frequencies.

12. In apparatus according to claim 11, said analyzer comprising a frequency-selective amplifier.

13. In apparatus according to claim 12, said lens excitation control means comprising a lens current controller, a servomotor for setting said current controller, and circuit means under control by said output of said amplifier for energizing said motor to vary the setting of said current controller as long as said output fails to contain frequencies corresponding to said given system of space frequencies.

14. In apparatus according to claim 11, said particle beam microscope having a stigmator for correction of astigmatism, said line scanning means of said device having a deflector system for deflecting the scanning electron beam of said device, a mixer stage having two inputs and having an output connected to said deflector system for supplying deflecting voltage thereto, a line-deflection voltage generator connected to one of said mixer inputs for causing said system to effect line scanning of said image, a rotary-field generator optionally connectable to said other input of said mixer for causing the line scanning pattern to rotate one full rotation for several consecutive complete line scans, filter means connected to said analyzer means for filtering a share of frequencies out of said signal voltage, and stigmator control means connected between said filter means and said stigmator for varying the adjustment of the stigmator until during said rotation of said scanning pattern said share of frequencies exhibits a substantially constant amplitude.

References Cited

UNITED STATES PATENTS

| 2,973,433 | 2/1961 | Kramer | 250—49.5 |
| 3,051,860 | 8/1962 | Haine et al. | 250—49.5 X |
| 3,213,277 | 10/1965 | Hoppe | 250—49.5 |

WILLIAM F. LINDQUIST, Primary Examiner